United States Patent
Barziza

(10) Patent No.: US 6,865,035 B2
(45) Date of Patent: Mar. 8, 2005

(54) XY FINDER

(76) Inventor: Samuel W. Barziza, 1 Robin Hood La., Conroe, TX (US) 77301

(*) Notice: Subject to any disclaimer, the term of this patent is extended or adjusted under 35 U.S.C. 154(b) by 112 days.

(21) Appl. No.: 10/248,078

(22) Filed: Dec. 16, 2002

(65) Prior Publication Data

US 2004/0150899 A1 Aug. 5, 2004

Related U.S. Application Data

(60) Provisional application No. 60/319,031, filed on Dec. 14, 2001.

(51) Int. Cl.[7] .................................................. G02B 7/02
(52) U.S. Cl. ...................... 359/822; 359/823; 359/694; 359/827; 359/699
(58) Field of Search ................................. 359/811, 819, 359/827, 828, 829, 830, 822, 823, 813, 694, 702, 706, 699

(56) References Cited

U.S. PATENT DOCUMENTS

| | | | | |
|---|---|---|---|---|
| 3,589,260 A | * | 6/1971 | Ferra | 396/419 |
| 4,936,655 A | * | 6/1990 | Leib et al. | 359/896 |
| 5,388,563 A | * | 2/1995 | Hsu | 124/23.1 |
| 5,416,549 A | * | 5/1995 | Katsuyama et al. | 396/529 |
| 6,636,701 B1 | * | 10/2003 | Vezard et al. | 396/374 |

* cited by examiner

Primary Examiner—Georgia Epps
Assistant Examiner—Brandi N Thomas
(74) Attorney, Agent, or Firm—David B. Dickinson; Lundeen & Dickinson, LLP

(57) ABSTRACT

The present invention relates to a device for positioning a finder on the guide telescope and adjusting the finder without introducing bending stresses on the guidescope which cause distortion of the tube holding the optics of both the guidescope and the main telescope, which finder permits the user to manual adjust the finder to any position by relative movement of an x-axis adjustment and a y-axis adjustment.

14 Claims, 19 Drawing Sheets

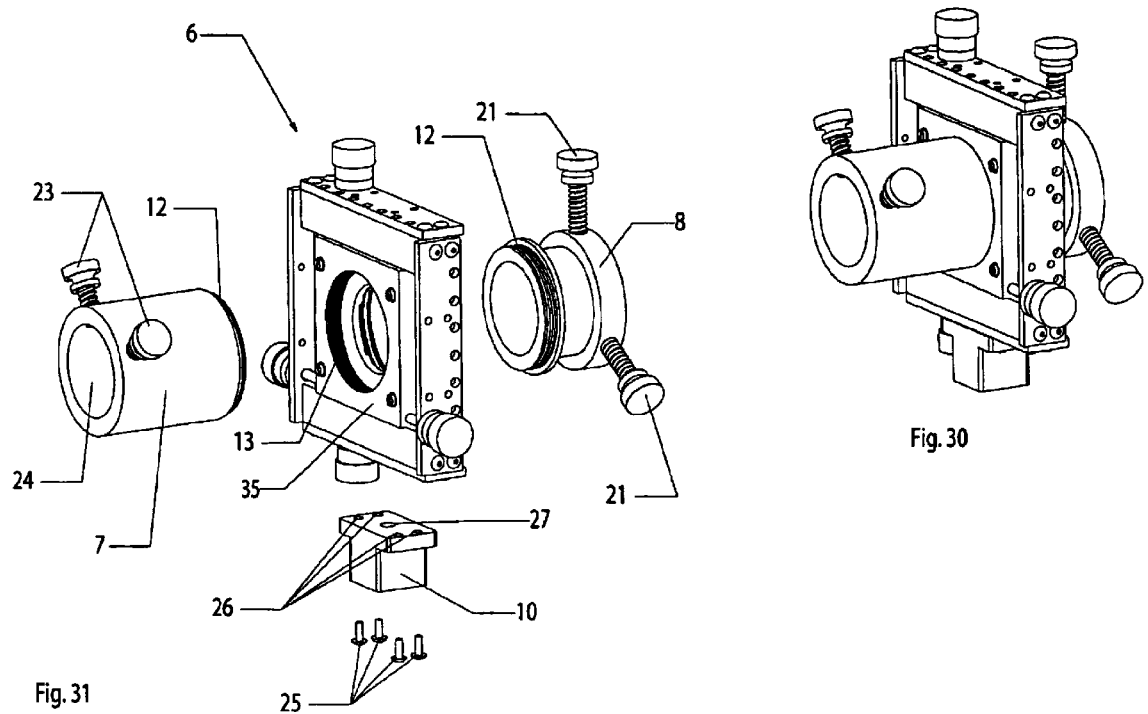
Fig. 30
Fig. 31
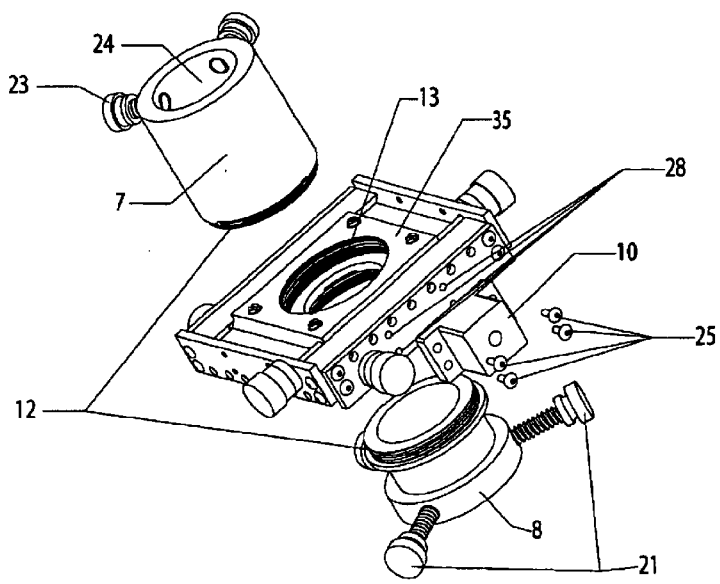
Fig. 32

XY FINDER

CROSS REFERENCE TO RELATED APPLICATIONS

This application claims the benefit of provisional application No. 60/319,031 filed Dec. 14, 2001 hereby incorporated herein by reference.

BACKGROUND OF INVENTION

This invention is a device that is specifically designed to address the need for finding guidestars, for autoguiding equipment, on an auxiliary telescope. This device further permits taking mosaic images if desired. The unit has two axes of motion, by means of fitted components, which are positioned by screws. These screw-actuated components allow for the precise positioning of stars onto the charge-coupled device (CCD) chip, and conversely these motions of fine adjustment allow the precise composure of astronomical objects, imaging sessions, as well as composing mosaics.

SUMMARY OF INVENTION

Currently there is no known device, which attaches to a telescope and allows the positioning of a imaging device across the field of view. Currently the only way to move an imaging device from one object to another or from one star to another star, requires physical adjustment the telescope's position. An operator must either manually or electronically re-position the telescope to align it on the next target. With auxiliary telescopes, ie. a small telescope attached on top of a larger telescope, for locating target stars, one must adjust the mounting bracket to which the auxiliary scope is attached. Adjusting the smaller auxiliary telescope or guidescope in this way creates differential flexure. The guidescope is no longer aligned with the optical axis of the main telescope; and, therefore, the optical principal optical axis of the guidescope guiding the main telescope will not be parallel to optical axis or optical plane of the main telescope. This misalignment results in star trails in the edges of the image being photographed or viewed through the main scope. Once the unit is attached to the guidescope for purposes of autoguiding, or on the main scope for purposes of imagining, turning one of two screws, adjusts the position for the ccd camera in the x or horizontal axis and turning another adjusts the position in the y or vertical axis.

Also a special plasticized hood is provided that wraps around the device. This hood is to prevent stray light from entering into the imaging camera. There are two variations of the XY Finder. One model provides a retro-fit of the focuser, by bolting or otherwise affixing directly onto the flip mirror focuser. The other model of the XY Finder is a more generic design capable of permitting the attachment of any type of device.

The XY Finder apparatus of the present invention for mounting to the guidescope and other attachments of an optical system provides a first plate providing a dovetail groove or tenon for slideable movement in a single direction; a second plate providing another groove or tenon for slideable movement in a single direction; a base plate having a groove or mortise on a side for mateable engagement of the groove on the first plate and a groove or mortise, perpendicular to the front-side groove or mortise axis, on its obverse side for mateable engagement of the groove tenon on the second plate; and means for selective and controlled movement of each plate in each groove or mortise of the base plate to positioning attachments made to each plate relative to each other. As may be readily appreciated, each moveable plate could alternatively provide a mortise or groove for accepting a tenon or mateable body protrusion on the base plate without departing from the spirit or intent of the disclosed invention.

BRIEF DESCRIPTION OF DRAWINGS

FIG. 30 is a perspective view drawing of a fourth alternative embodiment of the XY finder assembly with attached accessories.

FIG. 31 is an exploded perspective view drawing of the fourth alternative XY finder assembly of FIG. 30.

FIG. 32 is an alternative perspective view of the exploded XY finder assembly of FIG. 31.

DETAILED DESCRIPTION

Figure 1:
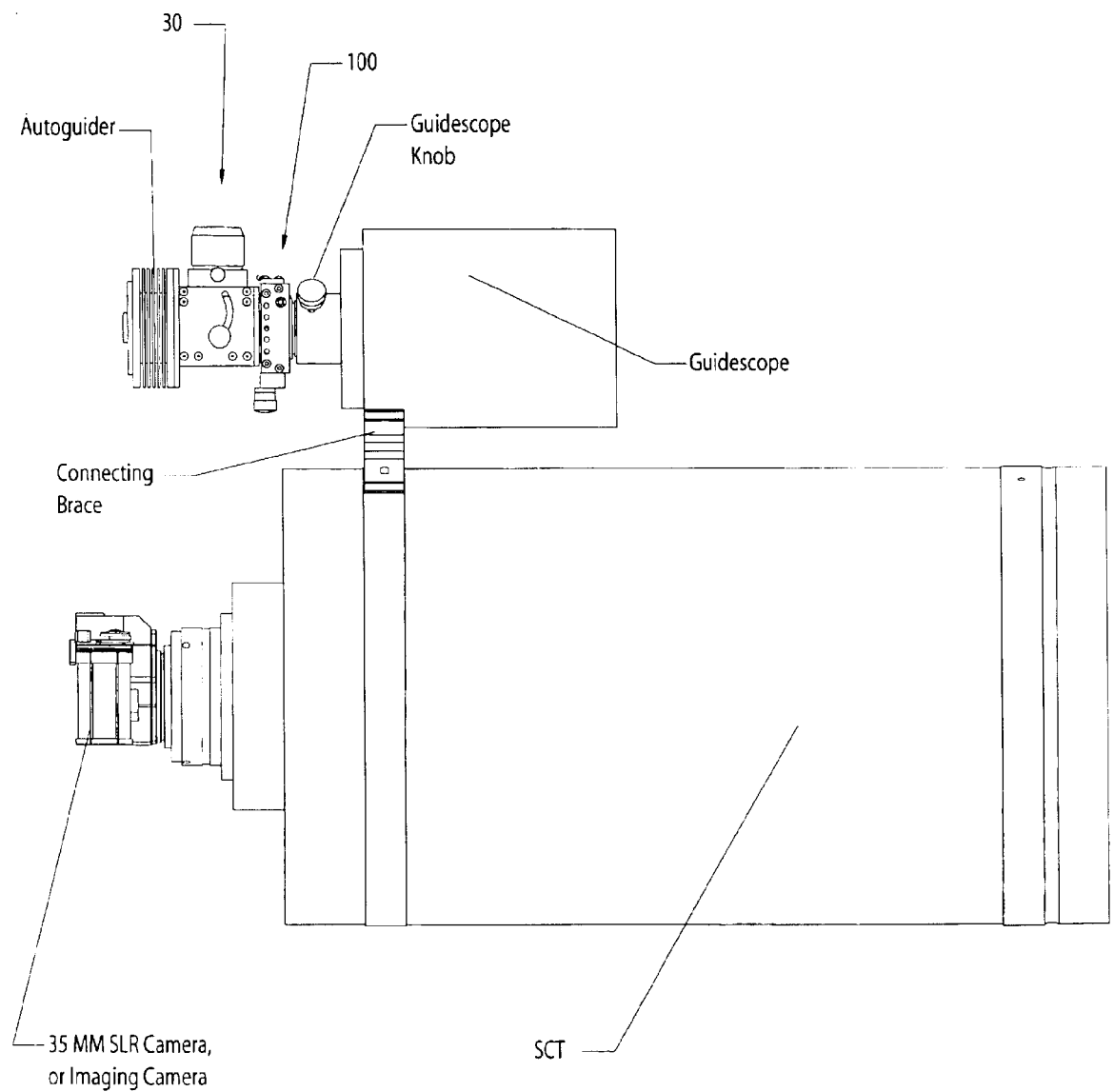
FIG. 1 is a silhouette view of the XY Finder retro-fitted onto a flip mirror focuser and the flip mirror focuser is retro fitted onto a autoguider attached to a guidescope attached on a larger or main telescope.
Figure 2:
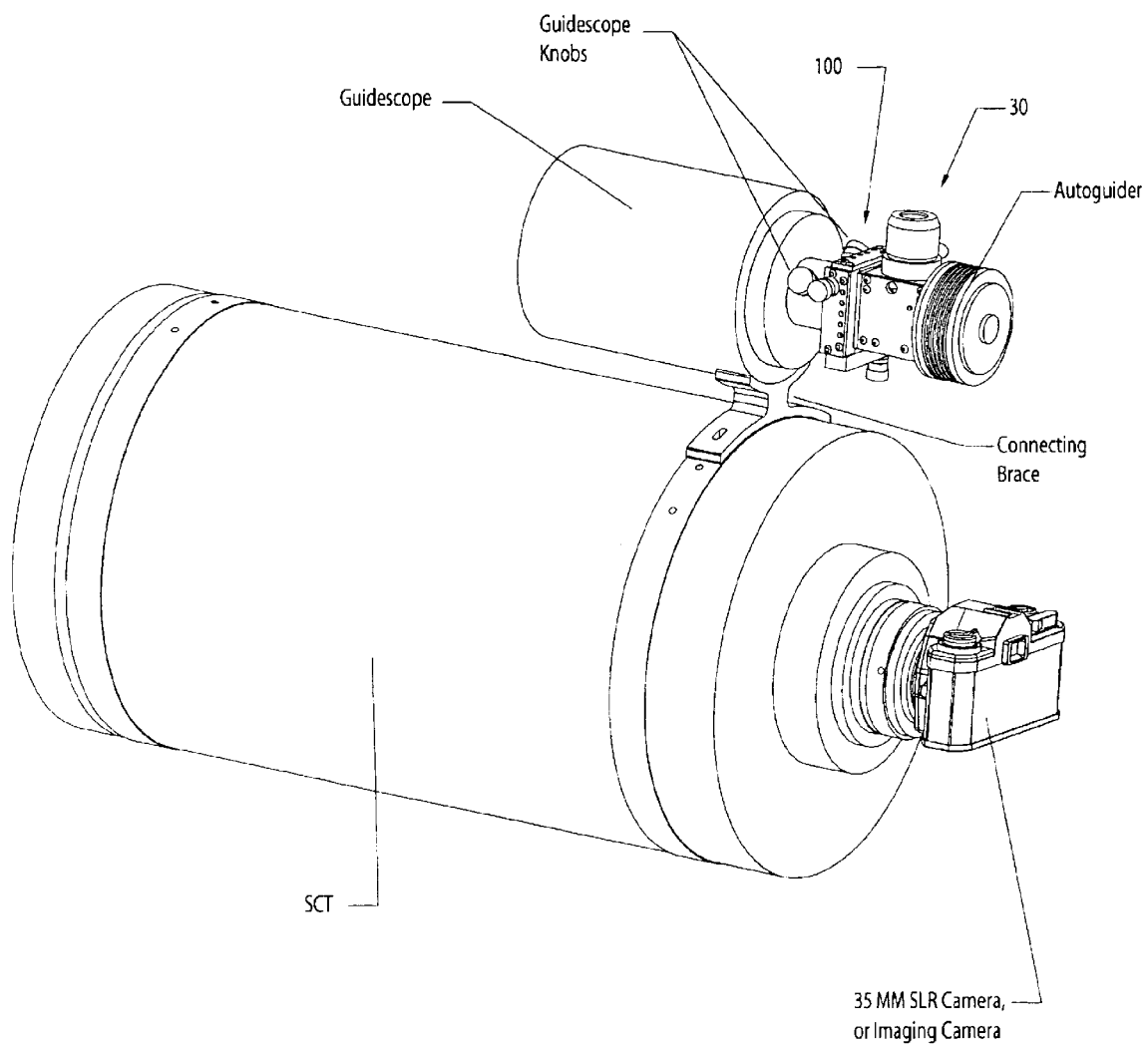
FIG. 2 is a perspective view of the XY Finder attached to a guidescope. The guidescope knobs hold the XY Finder securely in place.

As previously noted, there are no known devices that attach to a telescope and allow the cross travel of the imaging device or eyepiece across the field of the view. The XY Finder, both versions, satisfies these needs. Each is made from stock aluminum, but could be formed with any number of lightweight sturdy materials. After machining, all parts are de-burred and then black anodized. Standard commercially available components are utilized as well, such as bowed E-clips, knobs, machine screws, DELRON® washers, DELRON® spacers, thrust bearings, and ball plungers. The method for inserting and using the device is shown FIGS. 1, 2, and 3.

Figure 3:
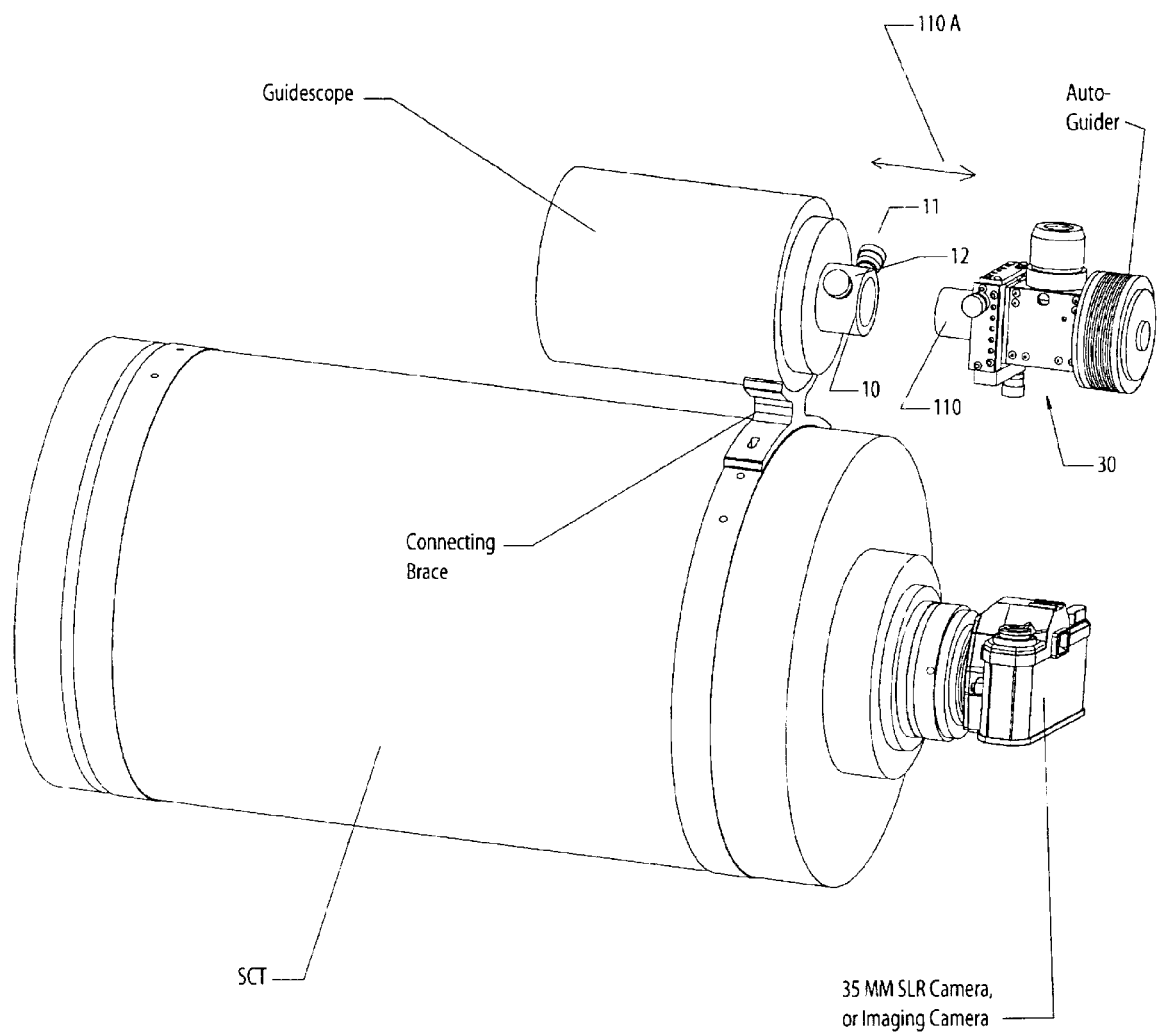
FIG. 3 is a perspective view of the inserting and removing the XY Finder from the guidescope, and this is illustrated by the arrow 110. The guidescope has a receptacle or port item 10 that has knobs or thumbscrews which allow the user to insert either eyepieces or other equipment into the guidescope. And on the XY Finder is a similar component 110 that is circular in shape but smaller in size that item 10 of the guidescope.

FIG. 3 shows the device being inserted into the guide scope receptacle 10 providing a standard eyepiece holder. The guide scope receptacle 10 can be provided with a plurality of guidescope knobs or thumbscrews 11, 12 that lock or fasten the eyepiece to the barrel 110. This arrangement is generally sufficient for holding most accessories onto the small auxiliary scope or guide scope of the telescope system.

Also, as noted on FIG. 3 the direction for insertion and removing is reflected by movement direction 110A illustrating the attachment of the XY Finder of the present invention and flip mirror focuser autoguider assembly onto a guide scope. Sliding barrel 110 into receptacle 10, then tightening the guide scope knobs 11, 12 completes the attachment. Also shown is a 35 MM single lens reflex camera (SLR) on the main telescope which shows the relative spacing of the XY Finder with the focal plane of the main scope. The use of SLR or CCD devices are well known in the industry.

Figure 4:
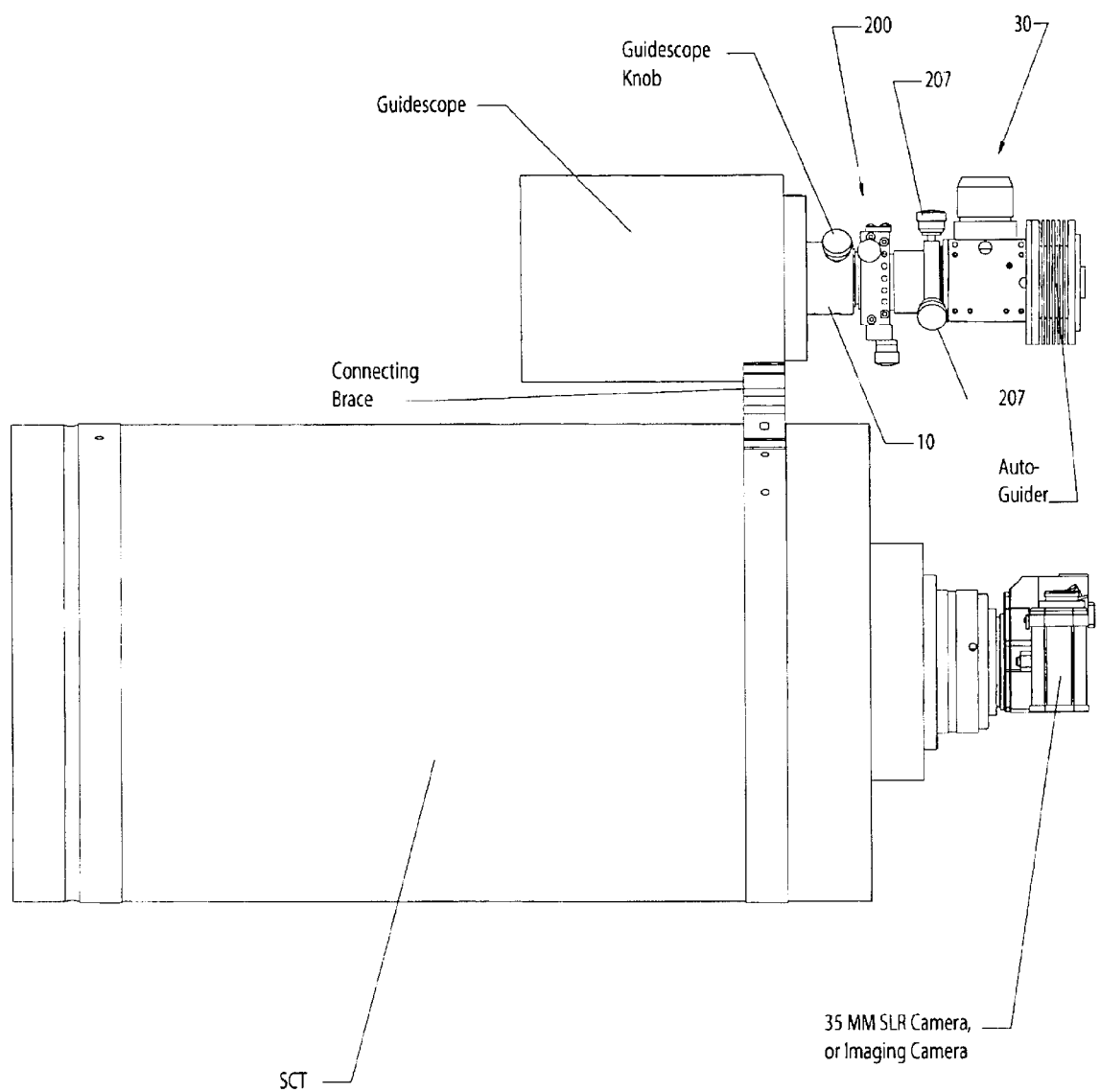
FIG. 4 is a silhouette view of the XY Finder, generic version.
Figure 5:
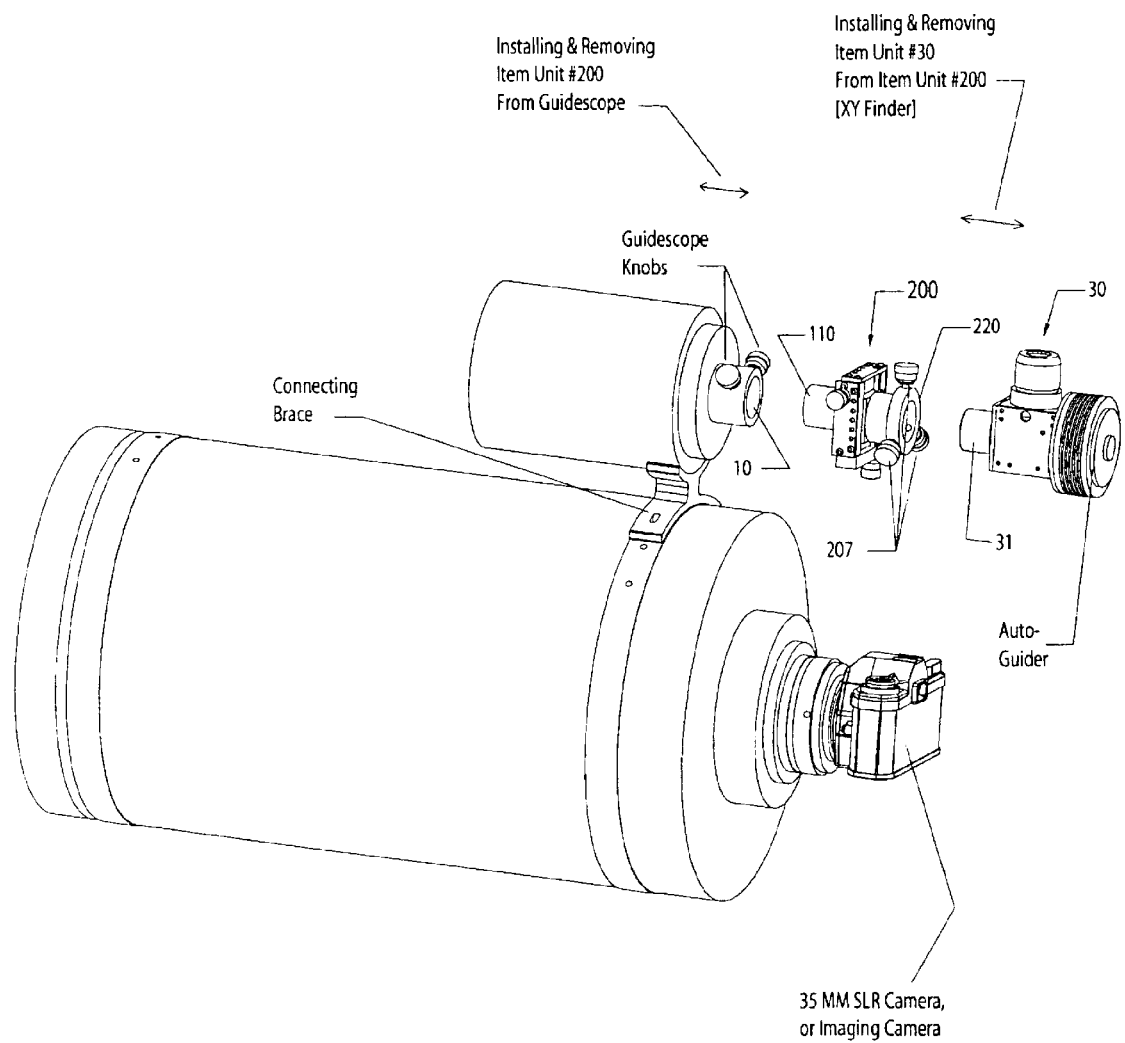
FIG. 5 is a perspective view of the XY Finder, generic version showing the insertion, and removing of the XY Finder from the guide scope, and the insertion and the removing of the flip mirror focuser-autoguider assembly, from the XY Finder.

FIGS. 4 and 5 further illustrate the assembly and use of the XY Finder 200, generic version. FIG. 4 shows the attached unit 200 inserted in the guide scope, and the attached flip mirror focuser 30 and/or autoguider on the XY Finder 200. FIG. 5 shows the direction for insertion and removal of the XY Finder 200 from the guide scope. For inserting the XY Finder 200 into the guide scope, barrel 110 slides into receptacle 10 as previously described, and the knobs 207 are tightened on the guide scope. For attaching the CCD camera or flip mirror focuser, barrel 31 similarly slides into the interior receptacle on the XY Finder 220 with the tightening of the knobs as previously described.

Figure 6:
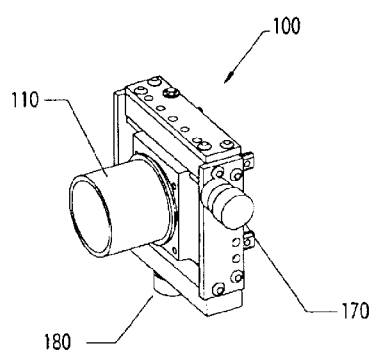
FIG. 6 is a perspective view of the front side of the XY Finder, flip mirror focuser model.

FIG. 6 shows a perspective view of the XY Finder body 100. The barrel 110 that attaches to guide scopes or telescopes is moved in the x and y-axes by knob 170, the X axis knob assembly, and knob 180, the Y axis knob assembly.

Figure 7:
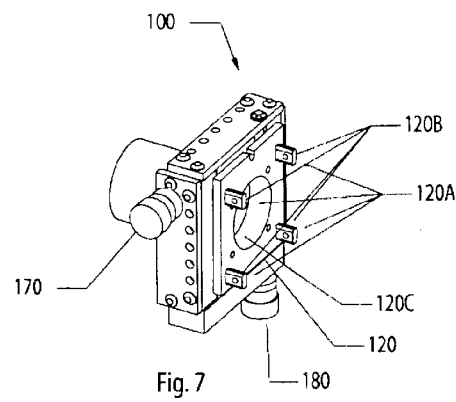
FIG. 7 is a perspective view of the backside of the XY Finder, flip mirror focuser model.

FIG. 7 shows the back side of the XY Finder body 100. Adapter 120 is a custom-fabricated part that will retro fit onto a flip mirror focuser. By providing for this adapter plate, any number of formats of mirror bodies may be accommodated with the XY Finder. The protruding tabs or bosses 120A have tapped threads 120B. The clearance hole or light entrance hole is shown in the plate at 120C. Adapter 120 has the same exact dimensions as the tabs on tube assembly 32, shown in FIG. 8.

Figure 8:
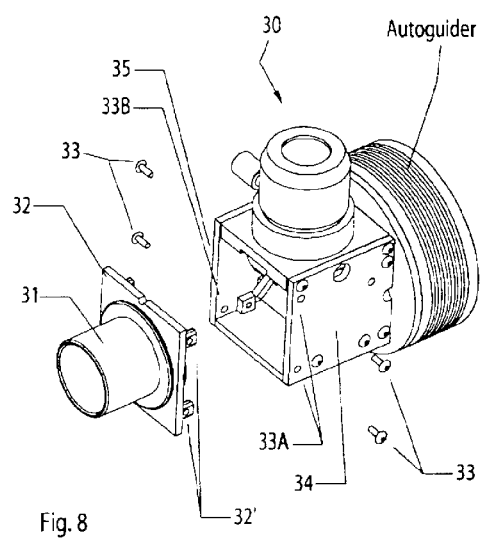
FIG. 8 is a perspective view of the flip mirror focuser, which illustrates the retro fitting procedure for the XY Finder.

In FIG. 8, the flip mirror focuser Autoguider assembly 30 is illustrated with the barrel assembly 32 removed. Threaded to this assembly 32 is adapter barrel 31 which slides into a guidescope eyepiece holder, such as receptacle 10 in FIG. 3. Screws 33 are removed from their location at 33A and 33B from plates 34 and 35 which form the flip mirror assembly in a manner well known to those in this industry.

Figure 9:
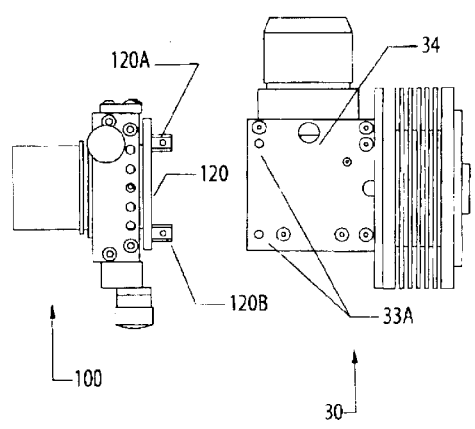
FIG. 9 is a silhouette view of installing the XY Finder onto the flip mirror focuser.

FIG. 9 shows the XY Finder 100, being positioned onto autoguider/mirror assembly 30. Once the screw holes 120B which are on the tabs 120A are aligned with the clearance holes 33A and 33B on plates 34 and 35, then machine screws 33 are inserted into the threaded holes 120B on tabs 120A of part 120 of the XY Finder Item 100. Once the screws are tightened then assembly 100 becomes securely attached to the flip mirror focuser, autoguider assembly, 30.

Figure 10:
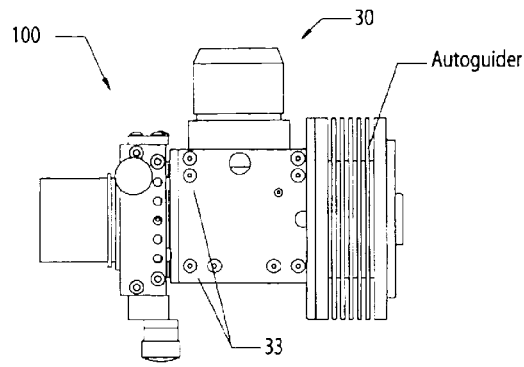
FIG. 10 is a silhouette view of the retro fitted version of the XY Finder attached to the flip mirror focuser.
Figure 11:
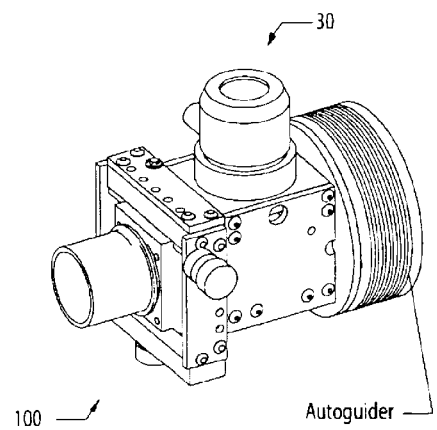
FIG. 11 is a perspective view of the retro fitted version of the XY Finder attached to the flip mirror focuser.

FIG. 10 is a silhouette view of the assembled XY Finder unit 100, and the flip-mirror/autoguider assembly 30. FIG. 11 is another perspective view of the assembled XY Finder 100 and mirror/autoguider assembly 30.

Figure 12:
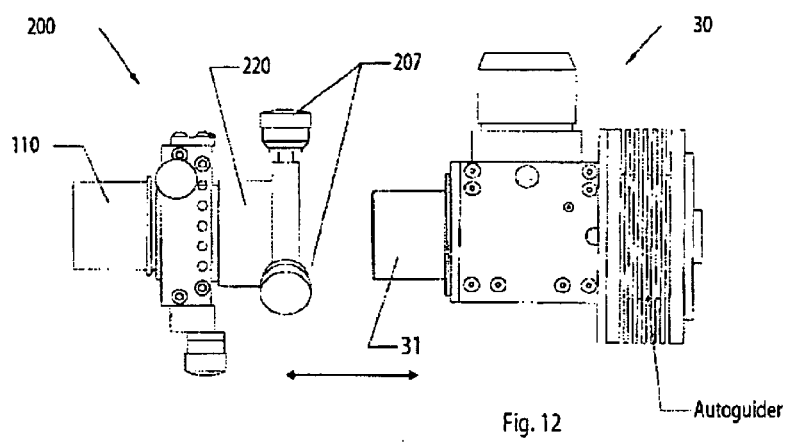
FIG. 12 is a silhouette view of the XY Finder generic version and the flip mirror focuser, which illustrates the insertion and removing of the flip mirror focuser-autoguider assembly.
Figure 13:
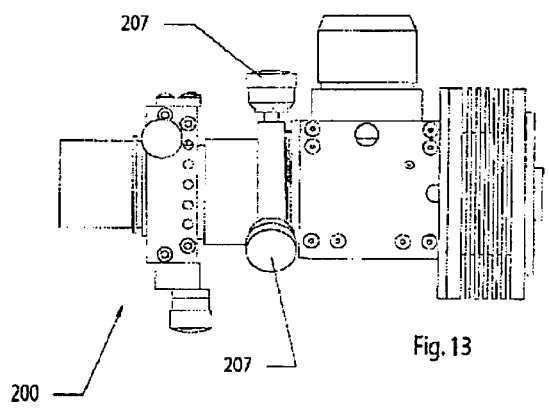
FIG. 13 is a silhouette view of the XY Finder generic version attached to the flip mirror focuser-autoguider assembly.
Figure 14:
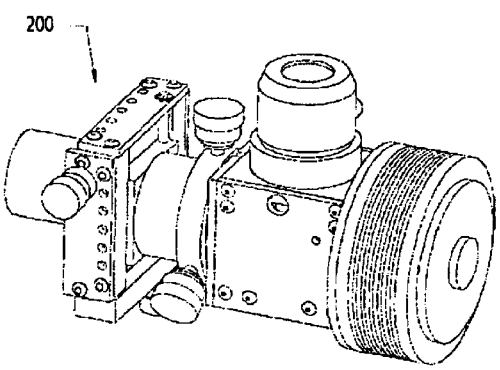
FIG. 14 is a perspective view of the XY Finder generic version attached to the flip mirror focuser-autoguider assembly.
Figure 14A:
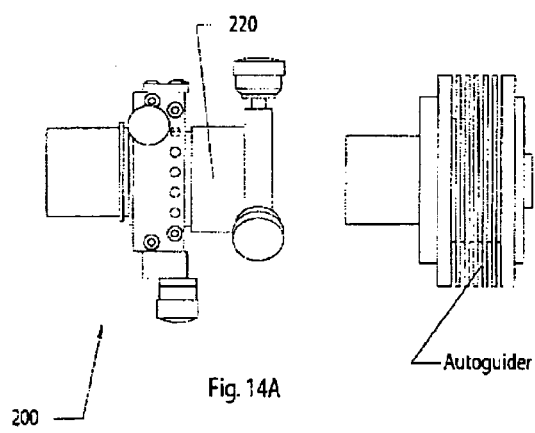
FIG. 14A is a silhouette view of the XY finder generic version and an autoguider assembly.
Figure 14B:
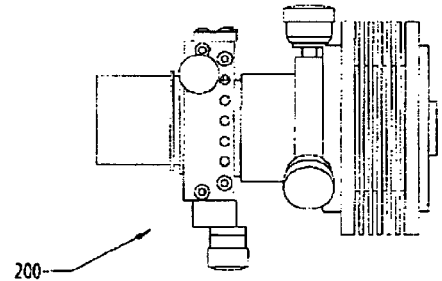
FIG. 14B is a silhouette view of the XY finder generic version connected to an autoguider assembly.

FIG. 12 is a silhouette view of XY Finder, generic version 200, also showing assembly 30 with an autoguider. Inserting flip mirror-autoguider assembly 30 into XY Finder 200 is done by sliding barrel 31 of the flip mirror focuser 30 into receptacle 220. On receptacle 220 are a plurality of knobs, 207 that secure barrel 31 to the receptacle 220 and therefore to the XY Finder 200. The direction of insertion and removal of the flip mirror focuser 30 is shown in the arrow in FIG. 12. FIG. 13 is a assembled view of the entirety of the mirror/autoguider assembly 30 attached to XY Finder 200, while FIG. 14 is another perspective view of attached the same from a different vantage point. FIGS. 14A and 14B show the XY Finder 200 detached and attached to an autoguider assembly.

Figure 15:
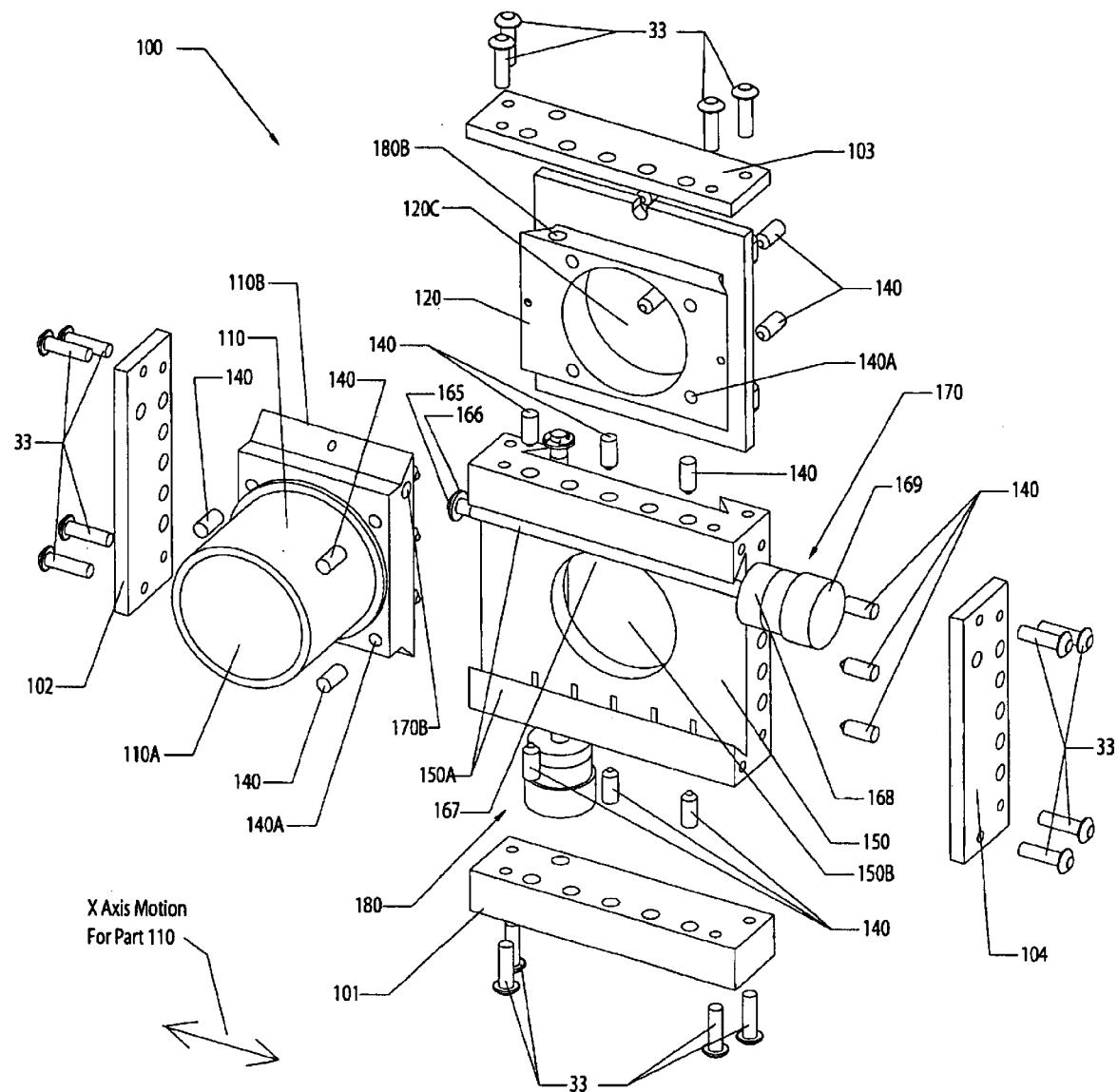
FIG. 15 is an exploded, perspective view of the front of the retro fit version of the XY Finder.

FIG. 15 is an exploded view of the front of the XY Finder base 100. The major components are the X-Y base support plate 150, which is a machined part that has twin inside dove cuts, [a 45 degree angled cut] 150A. These dove cuts are perpendicular to one another. Also through support plate 150 is a passageway or hole to allow the unobstructed passage of light 150B. Shown in FIG. 16, an exploded perspective view of the back of the XY finder are threaded holes 140A in plate 150. These threaded holes are for ball plunger screws 140. A ball plunger screw is similar in appearance to a common set screw, but provides a ball plunger a miniature ball and spring. The spring provides force on the ball, such that the ball provides a smooth constrained force on the moving surfaces. Ball plunger screws 140 are utilized in both versions of The XY Finder. The ball plunger screws are used on the moving parts X-plate 110, and Y-plate 120, and also frustroconical adapter 220 shown in FIGS. 17 and 18. Base plate 150 also has threaded holes 33B for machine screws 33, shown in FIG. 17. There are 4 end plates, 101, 102, 103, and 104 which bolt onto plate 150.

Figure 17:
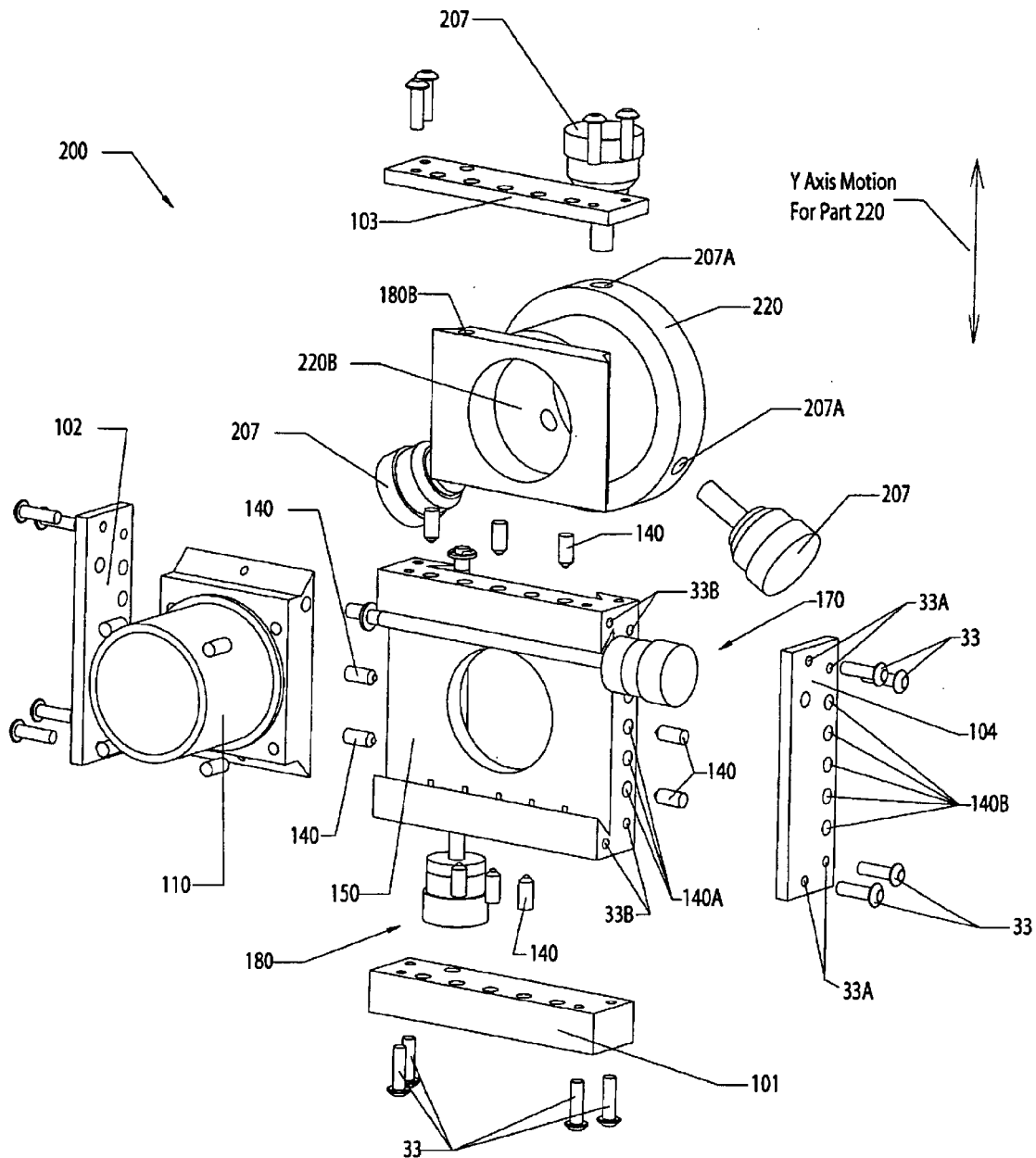
FIG. 17 is an exploded, perspective view of the front of the generic version of the XY Finder.
Figure 18:
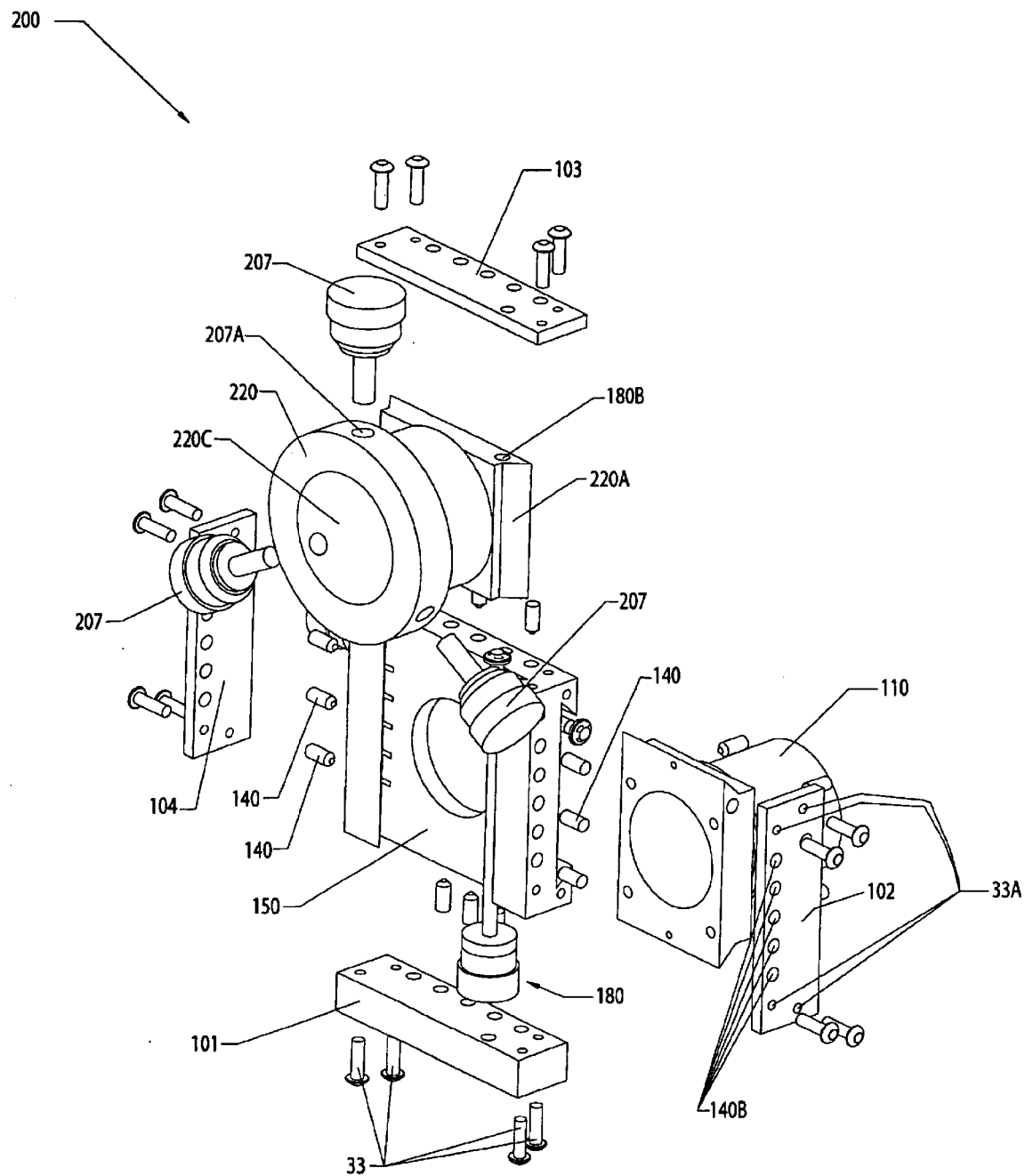
FIG. 18 is an exploded, perspective view of the back of the generic version of the XY Finder.

These end plates serve two purposes. First, they act as stops, for the moving parts X-plate 110 and Y-plate 120, and also for the part barrel 220 in the XY Finder, generic version. Second, these end plates also hold the positioning screw assemblies. End plates 102 and 104 hold the screw assembly, support knob 170 and limit the travel of the X-plate 110. Plates 101 and 103 hold the screw assembly, support knob 180 and limit the travel of the Y-plate 120 (and alternative version, barrel 220). On all four end plates, there are clearance holes 140B for the ball plunger screws 140, and also clearance holes 33A for the machine screws 33, which are illustrated in FIGS. 16, 17 and 18.

Figure 16:
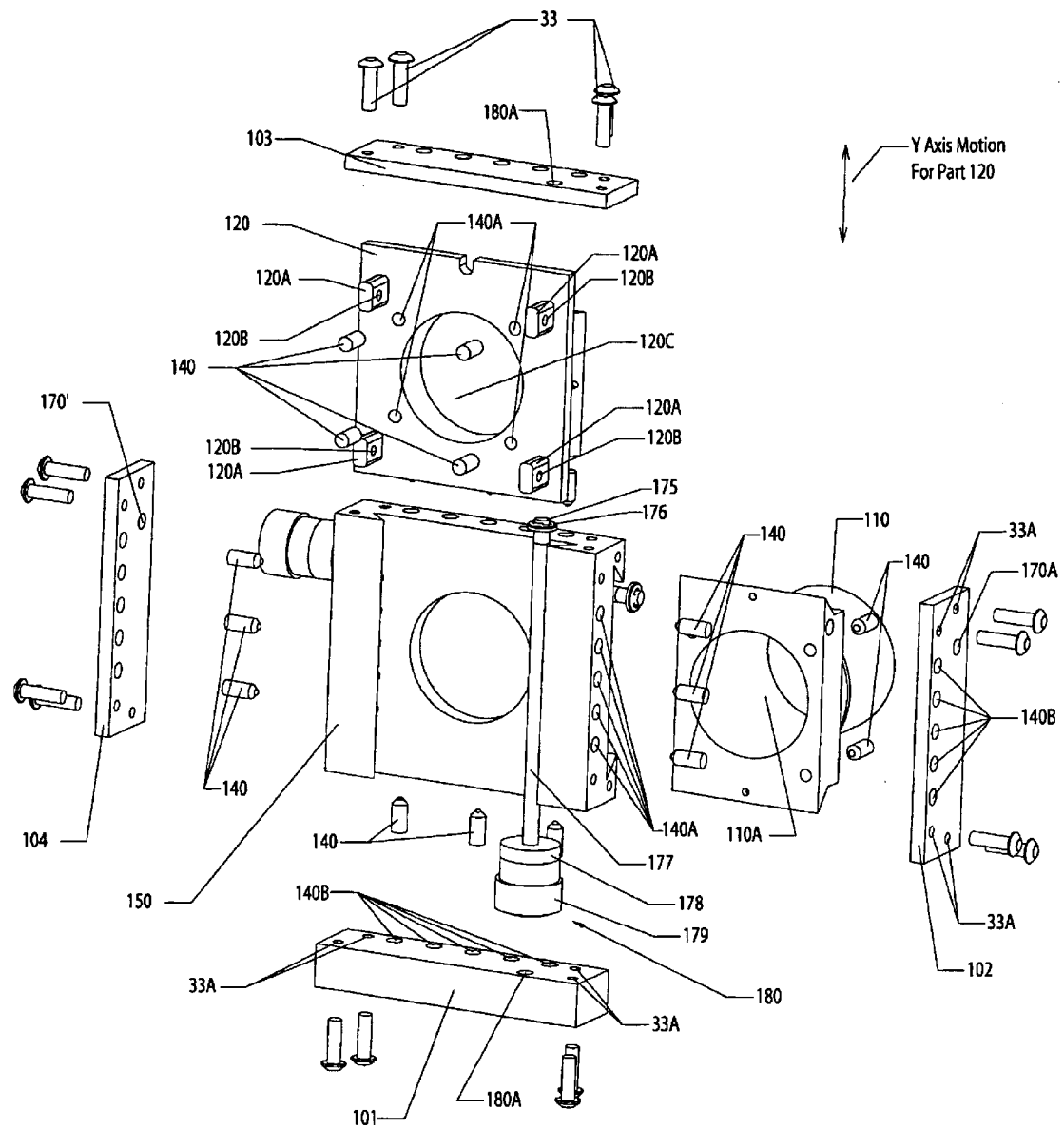
FIG. 16 is an exploded, perspective view of the back of the retro fit version of the XY Finder.

In FIG. 16, the screw assembly clearance hole 170A for side plate 102 is shown, and also for opposing side plate 104. Screw clearance hole 180A is shown in FIG. 16 in the upper and lower plates 101 and 103.

As previously noted, plate or slide 110 moves in the X direction. It provides a large clear interior passageway for the passage of light 110A. Also plate or slide 110 has outside 45 degree angle profile 110B to engage the profile of the base plate 150. Plate or slide 110 shown in FIG. 15 has a circular boss that protrudes from the base of the part. This circular diameter boss is the same size of eyepiece barrels will insert into and mate with the receptacle of standard telescopes. Also on slide 110 are threaded holes 140A for the ball plunger screws 140. Plate or slide 110 also provides the threaded hole that is in the side of the base for the positioning screw 167, which is part of the screw assembly 170. The base of plate or slide 110 is perpendicular to face for the hole 170B. In FIG. 16, for part, Y-plate or slide 120, travels in the Y axis direction. Plate or slide 120 again is provided with a passageway or hole 120C for the passage of light. The tabs 120A provide threaded holes at each distal end 120B for bolting or attachment to the flip mirror focuser assembly 30, which was previously discussed.

Also on slide or plate 120, there are threaded screw holes 140A for ball plunger screws 140. These threaded holes are located on the face of the part. In FIG. 15, slide or plate 120 has a threaded screw hole 180B to accommodate the shaft 177 of y-axis adjustment knob 180, which is shown in FIG. 16. Similar to its x-axis cooperating plate, y-axis plate or slide 120 has outside 45 degree angled cuts on both sides to match and engage the angled cut in base plate 150. Threaded screw hole 180B located through plate 120 parallel to the face of the slide.

The adjustment knobs are each inserted to provide the x-axis and y-axis movement as may be readily appreciated from the drawings. For example, in FIG. 15, x-axis knob 170 and screw assembly is composed of five parts. Knob 169 threads onto screw 167 which is supported by DELRON® washer 168. Another small DELRON® washer 166 supports the distal end of screw 167 against the base support plate 150, and is retained by bowed E-clip.165. On the screw 167, a notch is cut into the screw for the bowed E-clip 165 in a manner well known to those in this art.

In FIG. 16 the screw assembly 180, is likewise composed of five parts. Knob 179 threads onto the screw 177 and is similarly supported by DELRON® washer or spacer 178. Another smaller DELRON® washer 176 is secured to the distal end of screw 177 by bowed E-clip 175. On the y-axis screw 177, a notch is likewise cut into the distal end of the screw to retain the bowed E-clip.

FIG. 17 is an exploded view in perspective of the front of the XY Finder, generic version, 200. These two units, The XY Finder, and The XY Finder generic version are identical in all of the parts and components except for one part, the frustroconical barrel 220. This barrel 220 has a large inside diameter clearance hole for the passage of light 220B and as previously noted has a outside 45 degree angled cut on both sides of the Y-slide assembly 220A to mate with the dove tail cuts of the base plate 150. The assembly and method of use of both XY Finders is otherwise the same.

FIG. 18 is a exploded view in perspective of the back of the XY Finder generic version and shows the second clearance hole 220C which is larger than the clearance hole 220B, both of the clearance holes are concentric thereby forming a frustroconical passageway therethrough. The larger clearance hole accepts the insertion of eyepiece-like size barrels from other devices such as CCD cameras, and eyepieces. Barrel 220 has 3 threaded screw holes 207A spaced 120 degrees apart and are on the outside large diameter of the part for the knobs 207 to compressively engage the barrel of any device inserted therein. Barrel assembly 220 moves in the Y-axis.

Figure 19:
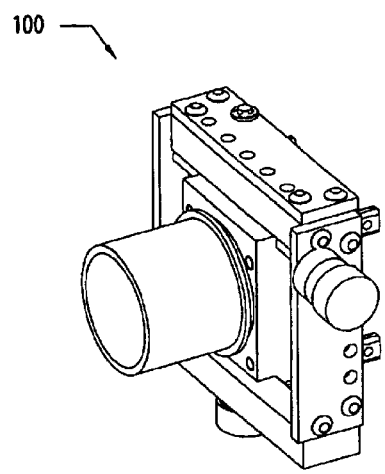
FIG. 19 is a perspective view of the front of the retro fit version of the XY Finder.
Figure 20:
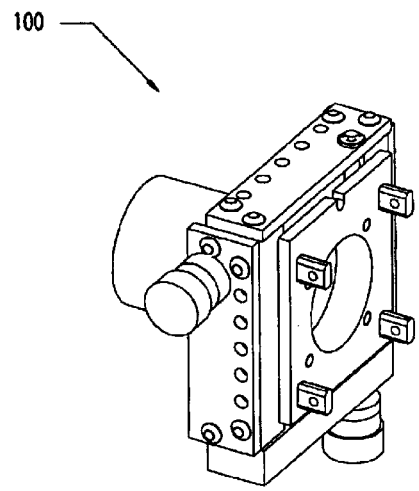
FIG. 20 is a perspective view of the back of the retro fit version of the XY Finder.

FIG. 19 is a uncluttered perspective front view of Item 100. FIG. 20 is a uncluttered perspective rear view of Item 100.

Figure 22:
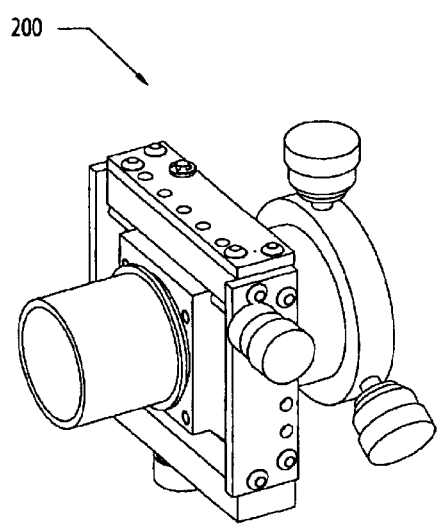
FIG. 22 is a perspective view of the back of the generic version of the XY Finder.
Figure 21:
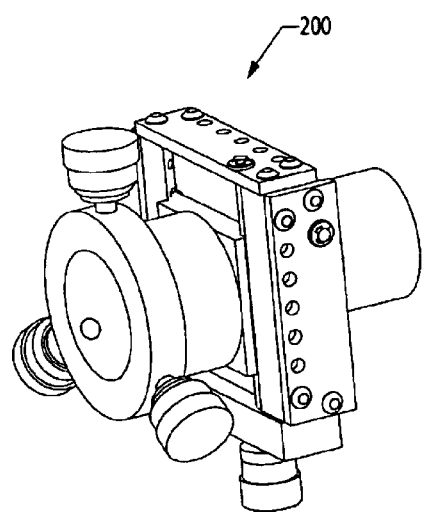
FIG. 21 is a perspective view of the front of the generic version of the XY Finder.

FIG. 21 is a uncluttered perspective front view of Item 200. FIG. 22 is a uncluttered perspective rear view of Item 200.

Furthermore, the XY finder of FIGS. 1–22 can be modified to exhibit different mounting alternatives and accessory items. The XY finder of FIGS. 1–22 consisted of 2 sliding sieve mounting components. Alternative embodiments shown in subsequent FIGS. 23–41 can be fabricated of alternative connection systems to provide more mounting options. A tripod adapter block to allow the XY finder to be mounted to a camera tripod is shown. A lens holder barrel is also shown with a bayonet mount to allow the mounting of a camera lens on one side of the XY finder.

Figure 23:
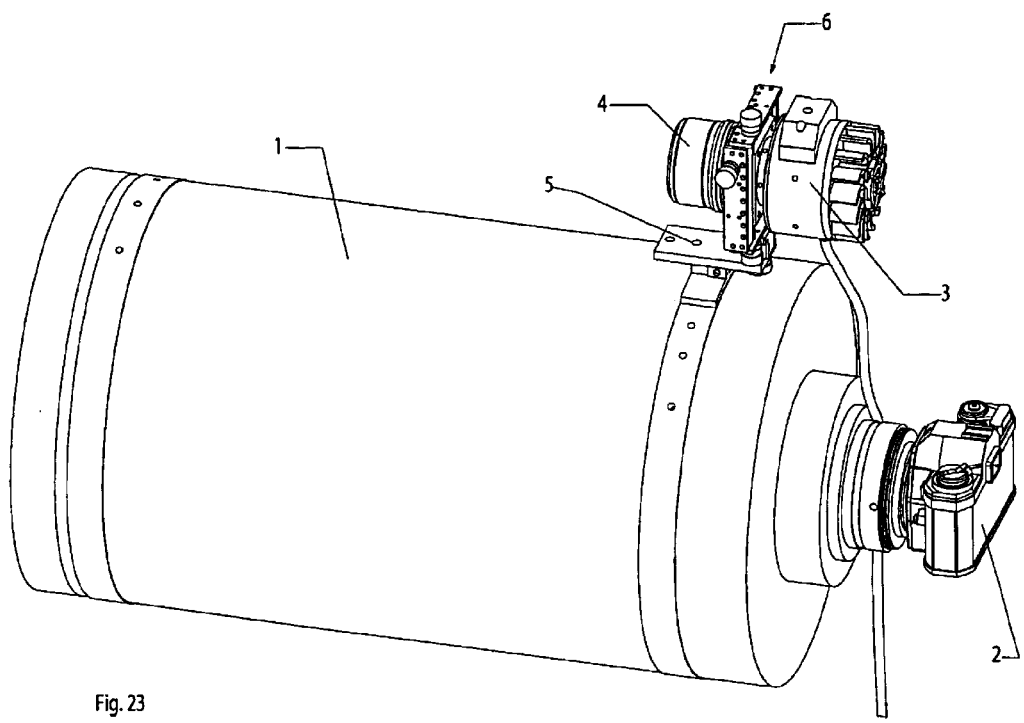
FIG. 23 is a first alternative embodiment of the XY finder shown attached to a CCD camera.

FIG. 23. shows the a first alternative XY finder 6 mounted to a CCD camera 3 and a camera lens 4. The XY finder is bolted onto a small bracket 5 and the bracket is mounted onto a telescope 1. A camera 2, or other imaging device, is attached to the telescope.

Figure 24:
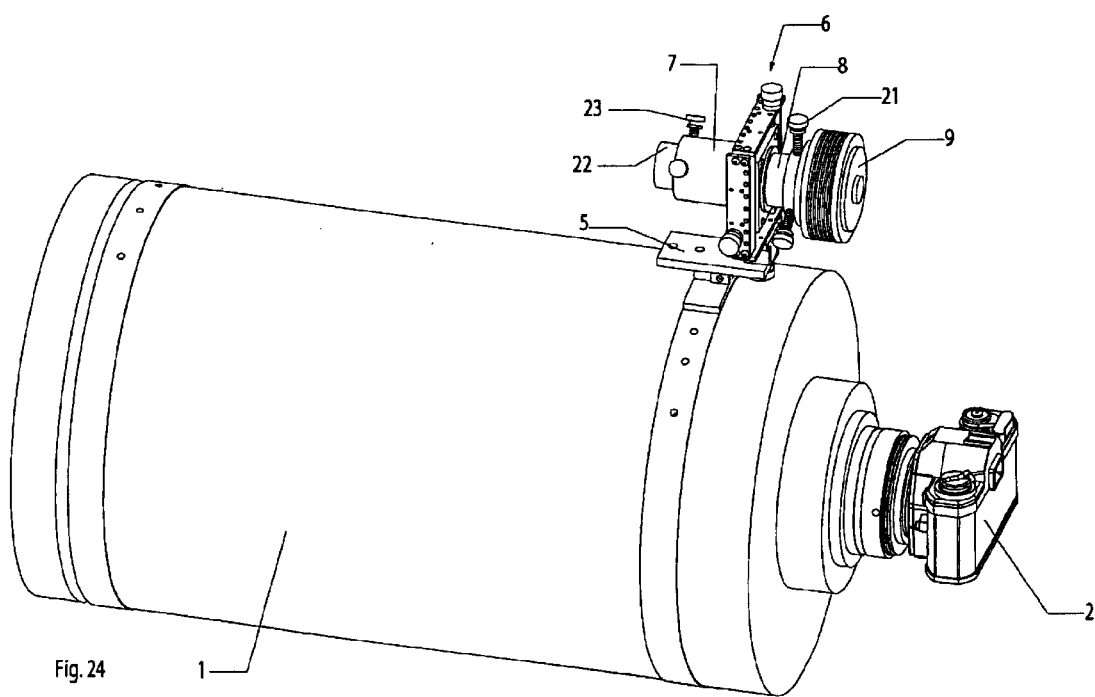
FIG. 24 is a second alternative embodiment of the XY finder shown attached to a CCD camera.

FIG. 24 shows a second alternative XY finder 6 mounted to a telescope 1 with a camera 2. XY finder 6 of FIG. 24 includes a small lens holder barrel 7 to hold small lens 22 in place with thumb screws 23. XY finder 6 of FIG. 24 also includes a receptacle barrel 8 that allows the insertion of a CCD camera 9. CCD camera 9 is held in place by thumb screws 21.

Figure 25:
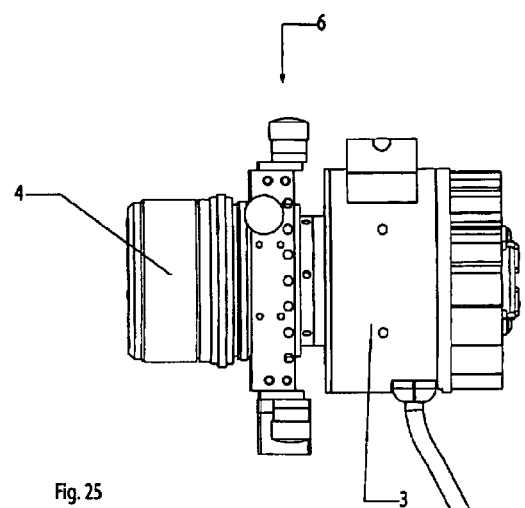
FIG. 25 is a silhouette view of the XY finder of FIG. 23 attached to a CCD camera and a camera lens.
Figure 26:
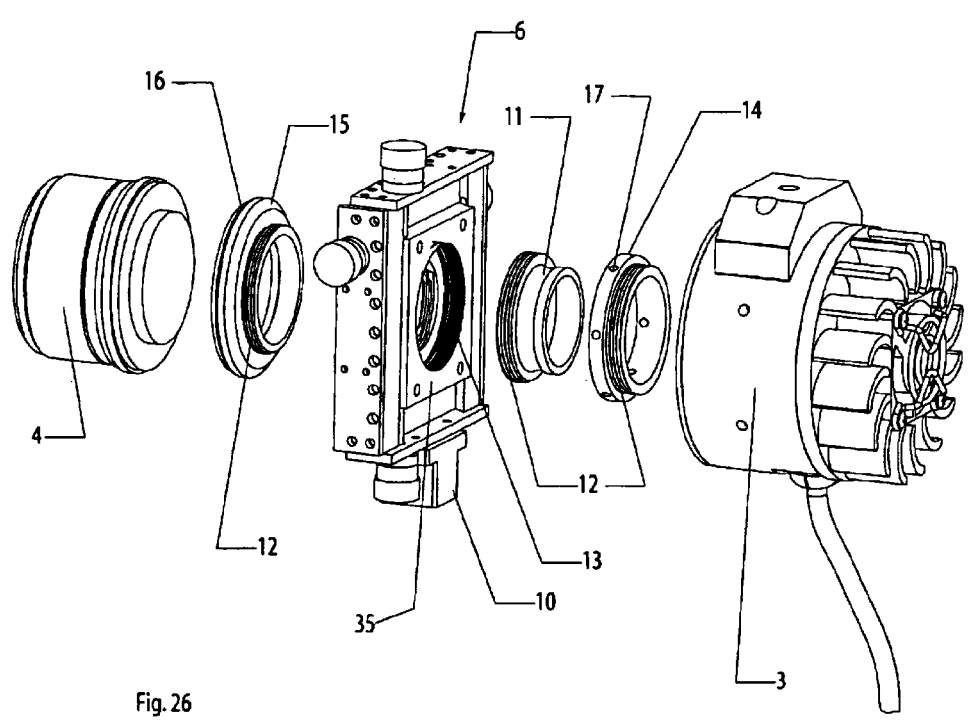
FIG. 26 is an exploded, perspective view of the XY finder assembly of FIG. 25.

FIGS. 25 and 26 show the XY finder 6 of FIG. 23 in more detail. In these figures, a CCD camera 3 and a camera lens 4 are attached to the XY finder 6. A principal feature of the XY finder of FIGS. 23, 25–26 is the threaded sliding parts. The sliding component 35 of the XY finder 6 of FIG. 26 has inside threads 13. The assembly uses a two piece coupling unit that includes clamp 14 and hub 11 connected together by screws 17. Clamp 14 threads into CCD camera 3 and hub 11 threads into internal threads 13 of XY finder 6.

Figure 27:
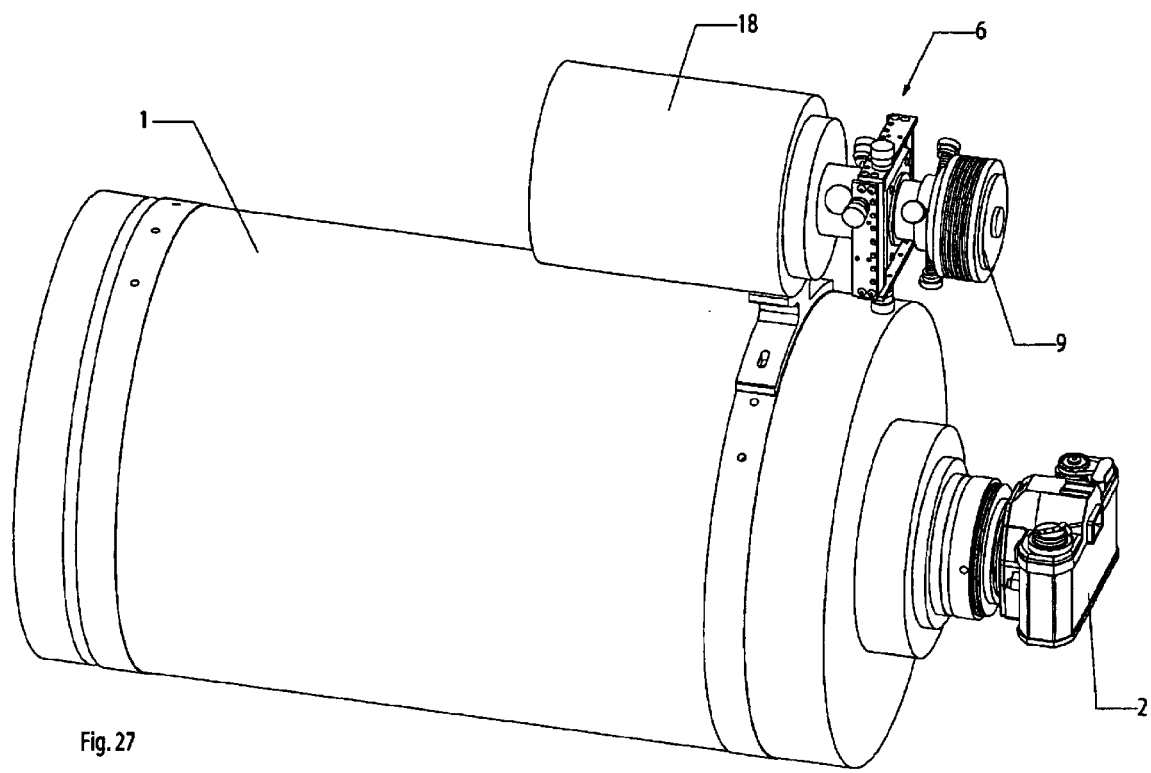
FIG. 27 is a third alternative embodiment of an XY finder shown attached to a guidescope and a CCD camera.
Figure 28:
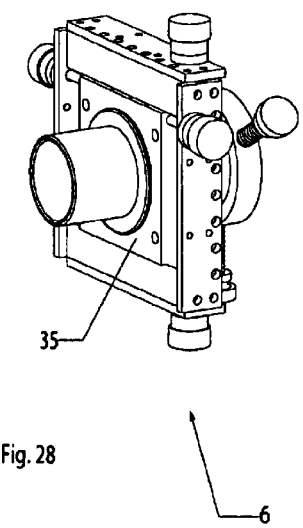
FIG. 28 is a perspective view drawing of the third alternative embodiment of the XY finder assembly of FIG. 27.
Figure 29:
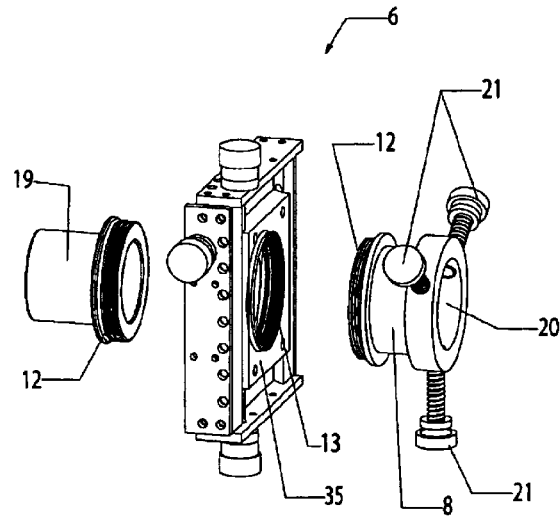
FIG. 29 is an exploded perspective view drawing of the XY finder assembly of FIG. 28.

FIG. 27 shows a third alternative embodiment of the XY finder 6 attached to a guidescope 18 and a CCD camera 9. FIGS. 28–29 are close-up perspective and exploded views of the XY finder 6 of FIG. 27. XY finder 6 of FIGS. 27–29 includes a flanged barrel 19 with an outside diameter thread 12 for threading barrel 19 into item 35 of XY finder 6. A receptacle 8 includes outside threads 12, of the same designation as those of barrel 19 and is likewise threaded into the other side of item 35 of XY finder 6. Receptacle allows the attachment of CCD camera 9 into an opening 20 and tightened with screws 21.

Figure 33:
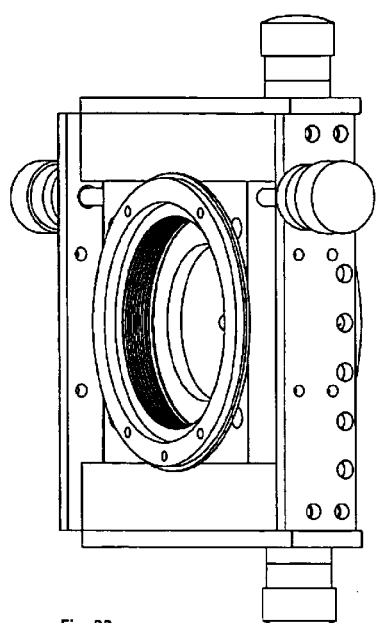
FIG. 33 is a perspective view drawing of the a fifth alternative embodiment of the XY finder assembly having a bayonet mount.
Figure 34:
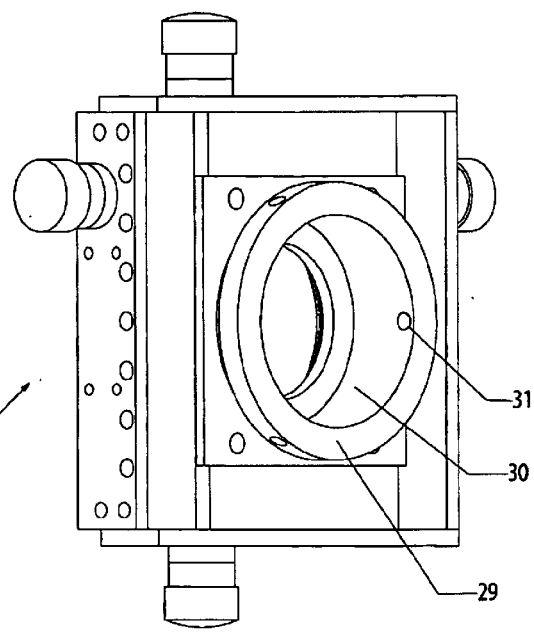
FIG. 34 is an alternative perspective view of the XY finder assembly of FIG. 33.
Figure 35:
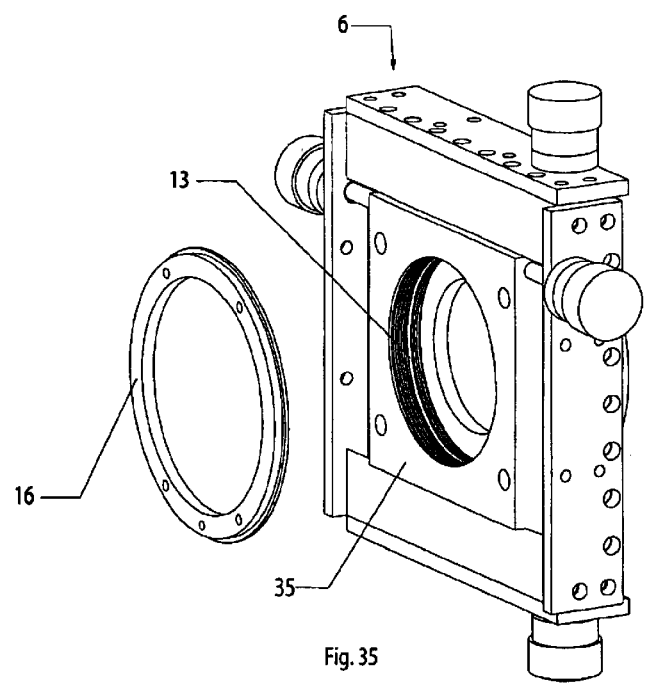
FIG. 35 is an exploded, perspective view drawing of the XY finder assembly of FIG. 33.

FIGS. 30–32 show a fourth alternative embodiment of the XY finder 6 with an accessory tripod mount 10 and a small diameter lens holder 7 attached. XY finder of FIGS. 30–32 includes a lens holder 7 that includes a receptacle 24 and thumbscrews 23 for holding small diameter lenses. Tripod adapter 10 is bolted onto the side of XY finder 6 with machine screws 25 FIGS. 33–35 show a fifth alternative embodiment of the XY finder 6 with a standard SLR camera lens bayonet mount mounted directly to sliding component 35 of XY finder 6. This embodiment includes a sliding component 29 with a receptacle opening 30 and securing screws 31.

Figure 36:
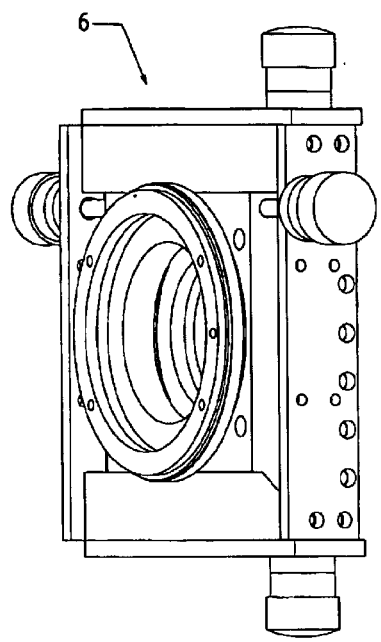
FIG. 36 is a perspective view drawing of a sixth alternative embodiment of the XY finder.
Figure 37:
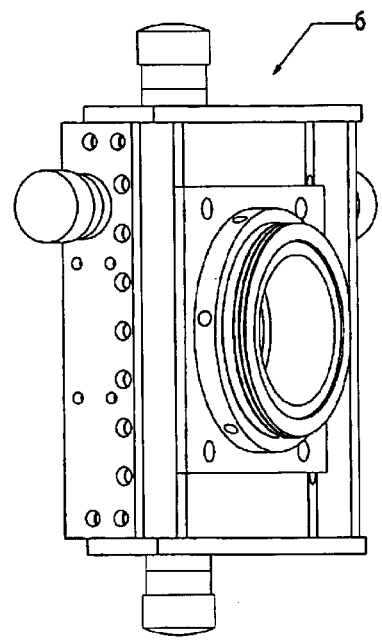
FIG. 37 is an alternative perspective view drawing of the XY finder of FIG. 36.
Figure 38:
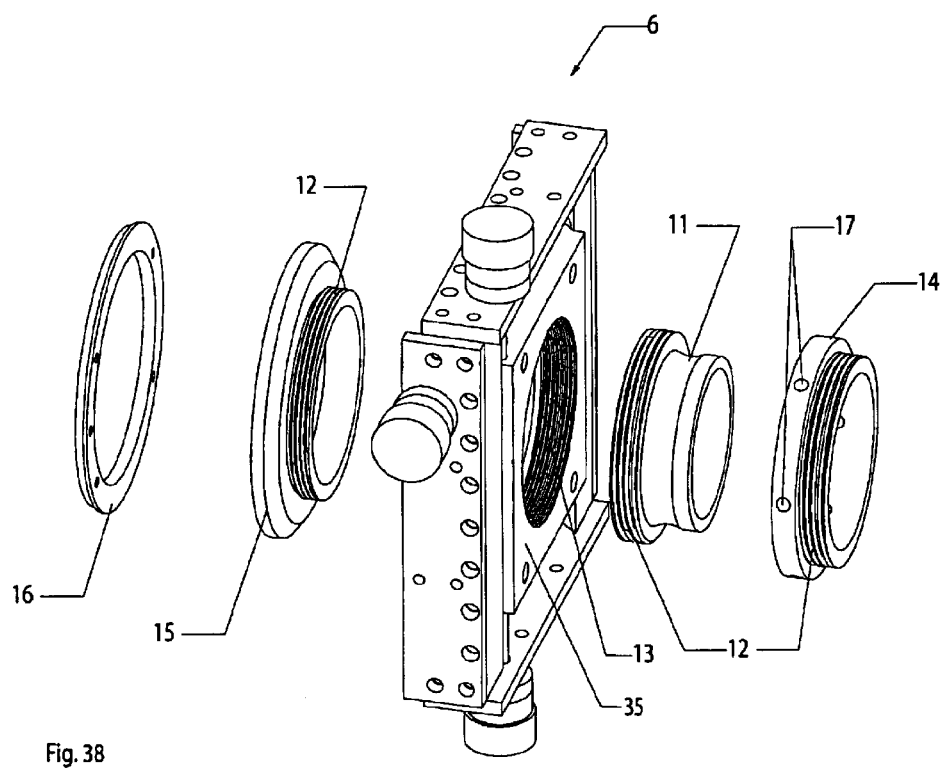
FIG. 38 is an exploded perspective view drawing of the XY finder of FIG. 36.

FIGS. 36–38 show a sixth alternative embodiment of the XY finder 6, an embodiment that includes a two piece coupling unit of FIG. 26 and accessory mounts 16 and 115 that are threaded directly onto the XY finder 6.

Figure 39:
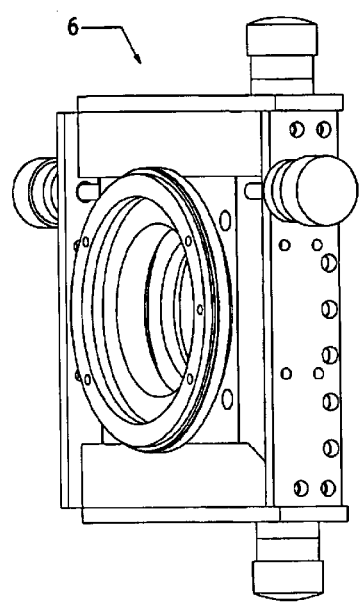
FIG. 39 is a perspective view drawing of a seventh alternative embodiment of the XY finder.
Figure 40:
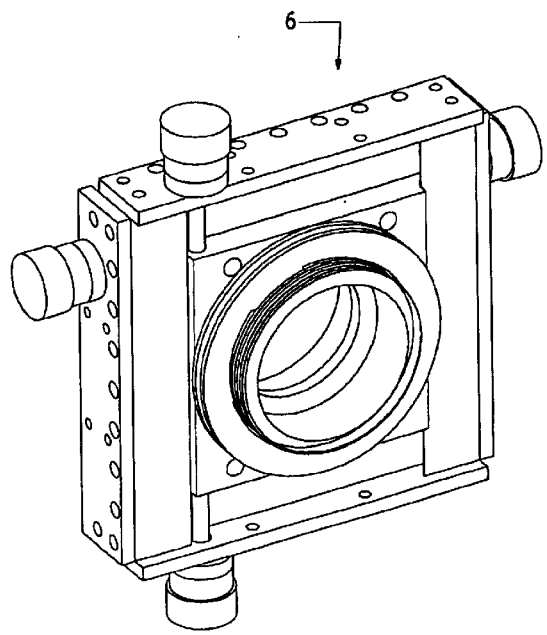
FIG. 40 is an alternative perspective view drawing of the XY finder of FIG. 39.
Figure 41:
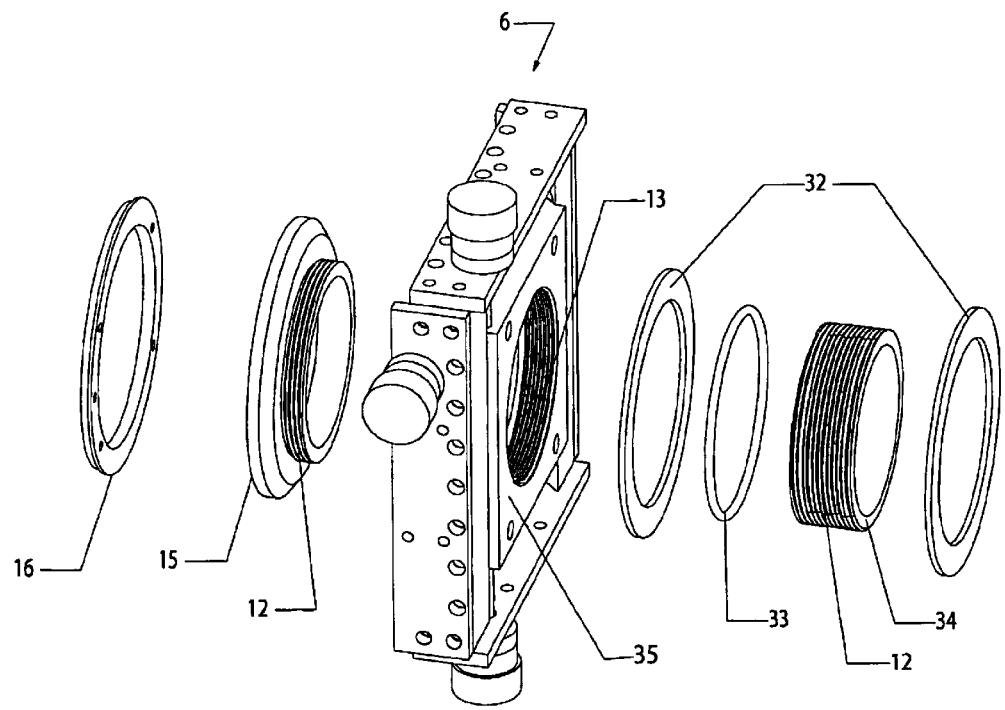
FIG. 41 is an exploded perspective view drawing of the XY finder of FIG. 39.

Finally, FIGS. 39–41 show a seventh alternative embodiment of the XY finder 6 that uses an tube 34 with external threads 12. XY finder assembly 6 also includes washers 32 and an o-ring 33 that are combined with tube 34 and inserted into the threaded region of XY finder and into the threaded region of a CCD camera or other imaging device. The use of threaded tube 34 allows a low-profile coupling to be achieved. O-ring 33 allow for a compressed, but flexible, fit when compressed between washers 32. Such a compressed, but flexible, fit will allow an attached CCD camera to be rotated about the center optical axis to permit the desired orientation of the CCD chip relative to the field of view. It should also be understood that a similar mechanical compressed fit can be achieved through the use of a bevel washer, a spiral washer, or wave spring washer in place of the o-ring.

What is claimed is:

1. An XY Finder apparatus for mounting to the guidescope and other attachments of an optical system comprising:
    a first plate providing a groove for slideable movement in a single direction;
    a second plate providing a groove for slideable movement in a single direction;
    a base plate having a grove on a side for mateable engagement of the groove on the first plate and a groove, perpendicular to the front-side groove axis, on its obverse side for mateable engagement of the groove on the second plate;
    wherein said first plate, said second plate, and said base plate each provide an interior passageway for the passage of light; and
    means for selective and controlled movement of each plate in each groove of the base plate to positioning attachments made to each plate relative to each other.

2. The XY Finder of claim 1 wherein the second plate additionally provides a frustroconical tube permitting connection of a variety of optical attachments to the Finder.

3. An XY finder apparatus to mount to a guidescope and other attachments of an optical system, the XY finder apparatus comprising:
    a first plate configured to provide slideable movement restricted to a first axis;
    a second plate configured to provide slideable movement restricted to a second axis;
    a base plate configured to receive said first plate and said second plate such that said first axis is perpendicular to said second axis, wherein said first plate, said second plate, and said base plate each provide an interior passageway for the passage of light;
    a first positioning device to direct movements of said first plate in said first axis;
    a second positioning device to direct movements of said second plate in said second axis; and
    said first positioning device operating independently of said second positioning device.

4. The XY finder of claim 3 further comprising a mount upon said first plate for optical attachments.

5. The XY finder of claim 4 wherein said optical attachments are selected from the group comprising CCD Cameras, SLR Camera Lenses, Small diameter Lenses, and 1.25" size eyepieces.

6. The XY finder of claim 3 further comprising a mount upon said second plate for optical attachments.

7. The XY tinder of claim 6 wherein said optical attachments are selected from the group comprising CCD Cameras, SLR Camera Lenses, Small diameter Lenses, and 1.25" size eyepieces.

8. The XY finder of claim 3 further comprising a bayonet lens mount.

9. The XY finder of claim 3 further comprising a CCD camera mount, said CCD camera mount comprising a externally threaded tube and a rotation damping system.

10. The XY finder of claim 9 wherein said rotation damping system includes an o-ring compressed between two washers, said compressed o-ring acting as a rotation damper.

11. The XY finder of claim 3 further comprising a sliding tube lens mount, said sliding tube lens mount comprising two concentric tubes configured to be positioned relative to each other along a third axis.

12. The XY finder of claim 11 wherein said third axis is perpendicular to said first axis and said second axis.

13. The XY finder of claim 3 further comprising a two-piece coupling lens mount.

14. The XY finder of claim 3 further comprising a camera tripod mount.

* * * * *